(12) United States Patent
Wang et al.

(10) Patent No.: US 8,702,951 B2
(45) Date of Patent: Apr. 22, 2014

(54) MAIN BODY OF ELECTROPHORESIS DEVICE HAVING GLASS GEL CELL FAST ASSEMBLE STRUCTURE

(75) Inventors: Xiaoping Wang, Beijing (CN); Xiudong Gao, Beijing (CN)

(73) Assignee: Beijing Liuyi Instrument Factory, Beijing (CN)

( * ) Notice: Subject to any disclaimer, the term of this patent is extended or adjusted under 35 U.S.C. 154(b) by 0 days.

(21) Appl. No.: 13/526,836

(22) Filed: Jun. 19, 2012

(65) Prior Publication Data
US 2013/0334050 A1   Dec. 19, 2013

(51) Int. Cl.
*G01N 27/26* (2006.01)
*C25B 13/00* (2006.01)
*G01N 27/27* (2006.01)
*G01N 27/447* (2006.01)

(52) U.S. Cl.
USPC ........... 204/618; 204/467; 204/616; 204/466; 422/68.1; 422/82.01; 435/287.1

(58) Field of Classification Search
USPC .................. 204/456, 466, 467, 616–618; 435/287.1; 422/68.1, 82.01
See application file for complete search history.

(56) References Cited

U.S. PATENT DOCUMENTS

| | | | | |
|---|---|---|---|---|
| 5,632,877 | A | * | 5/1997 | Van Atta .................. 204/618 |
| 6,436,262 | B1 | * | 8/2002 | Perez ....................... 204/618 |
| 2002/0144879 | A1 | * | 10/2002 | Anderson et al. .......... 198/345.1 |

\* cited by examiner

*Primary Examiner* — Jennifer Dieterle
(74) *Attorney, Agent, or Firm* — Ryan A. Schneider, Esq.; Troutman Sanders LLP

(57) ABSTRACT

A electrophoresis device having glass gel cell fast assemble structure is provided, including a main body, a pair of electrode connection terminals attached to the main body, and side clamping parts pivotally connected to the main body on respective side of the main body for maintaining at least one glass gel cell to a surface of the main body. At least one sealing and positioning structure is provided on a surface of the main body including a U-shaped sealing strip partially inlayed on at least one surface of the main body, and at least a pair of positioning poles perpendicularly attached to the main body, wherein the U-shaped sealing strip having a U-shaped body to form a seal between the main body and the gel cell, and positioning protrusions formed on the respective free end of the U-shaped body.

2 Claims, 7 Drawing Sheets

MAIN BODY OF ELECTROPHORESIS DEVICE HAVING GLASS GEL CELL FAST ASSEMBLE STRUCTURE

BACKGROUND OF THE INVENTION

1. Field of the Invention

The invention relates to an electrophoresis device for stand electrophoresis, and particularly relates to an electrophoresis device having glass gel cell fast assemble structure.

2. Description of the Related Art

In today's common electrophoresis device for stand electrophoresis, a dedicated sealing strip is normally provided between the short glass plate and the main body of the electrophoresis device whereby a sealing is formed therebetween without the need to provide the short glass plate with a groove. Since a separate glass gel cell is used for casting gel, the glass gel cell has to be moved from the casting stand to the main body of the electrophoresis device. The assembly procedure of the glass gel cell to the main body is rather delicate and air bubble can be easily introduced into the gel during the assemble procedure as a consequence. Therefore, there is a need in the prior art that the structure of the main body can be improved to facilitate the assemble procedure of the glass gel cell and in the mean time positioning precision can be improved.

Moreover, in-situ gel casting cannot be realized by the stand electrophoresis device in the prior art which is a reason for the above mentioned introduction of air bubble into the casted gel. Therefore, there is also a need in the prior art the combine the electrophoresis device and the gel casting device together so that in-situ gel casting can be realized. In this text, in-situ casting refer to that the gel cell will not be displaced or moved during the whole procedure from gel casting to sample electrophoresis.

BRIEF SUMMARY OF THE INVENTION

The present invention comprises a main body of electrophoresis device having glass gel cell fast assemble structure so that the problem of introduction of air bubble during attachment of the gel cell to the main body of an electrophoresis device can be alleviated or avoided.

In one embodiment of the invention, a main body of electrophoresis device having glass gel cell fast assemble structure is provided which comprises a main body, a pair of electrode connection terminals attached to the main body, and side clamping parts pivotally connected to the main body on respective side of the main body for maintaining at least one glass gel cell to a surface of the main body; wherein at least one sealing and positioning structure is provided on a surface of the main body which comprises a U-shaped sealing strip partially inlayed on at least one surface of the main body, and at least a pair of positioning poles perpendicularly attached to the main body, wherein the U-shaped sealing strip having a U-shaped body to form a seal between the main body and the gel cell, and positioning protrusions formed on the respective free end of the U-shaped body; wherein each of the positioning poles is provided at its distal end with a guiding portion for guiding in the gel cell and a holding portion abut the main body so that the gel cell is maintained by the holding portions of the positioning poles and the positioning protrusions of the U-shaped sealing strip.

Preferably, the positioning poles having a surface perpendicular to the main body; and preferably, the positioning poles are attached to the main both at both surfaces of the main body.

Preferably, the guiding portion is in the form of a wedge or an arc.

When the gel cell is to be assembled to the main body, the top of the short plate of the gel cell is disposed against the positioning protrusions of the U-shaped sealing strip, the bottom of the short plate is then pushed to the positioning portion along the guiding portion so that the short plate is firmly positioned between the positioning poles and the positioning protrusions with the elastic property of the positioning protrusions as the U-shaped strip can be made of elastic material such as rubber, synthetic rubber or silicon. After the short plate is firmly maintained between the positioning poles and positioning protrusions, a long plate of the gel cell having sealing strip on both sides are attached to the short plate following the same assembly procedure for the short plate. After both the short plate and the long plate are firmly maintained between the positioning poles and positioning protrusions whereby the gel cell is formed, the respective clamping parts are pivoted from a horizontal position to a substantially vertical position so that at least one gel cell is firmly attached to the main body on at least one surface of the main body.

The main body of electrophoresis devices having glass gel cell fast assemble structure as disclosed by various embodiment of the invention are advantageous in that smooth and fast assembly of gel cell to the main body can be realized, and that in-situ gel casting is realized so that gel movement is no long necessary and as a result introduction of air bubble into the cast gel which may in turn affect the following experiment is alleviated or avoided.

Another aspect of this invention relates to an electrophoresis device having glass gel cell fast assemble structure which comprising a main body having the above mentioned feature and a glass gel cell, wherein the gel cell comprising a short plate, a long plate partially overlap with the short plate and side sealing strips disposed between side portions of the short plate and the long plate so that the side of the overlapping area is sealed.

When the gel cell is to be assembled to the main body, the top surface of the short plate of the gel cell is disposed against the positioning protrusions of the U-shaped sealing strip, the bottom of the short plate is then pushed to the positioning portion along the guiding portion so that the short plate is firmly positioned between the positioning poles and the positioning protrusions with the elastic property of the positioning protrusions as the U-shaped strip can be made of elastic material such as rubber, synthetic rubber or silicon. After the short plate is firmly maintained between the positioning poles and positioning protrusions, a long plate of the gel cell having sealing strip on both sides are attached to the short plate according to the same assembly procedure for the short plate. After both the short plate and the long plate are firmly maintained between the positioning poles and positioning protrusions whereby the gel cell is formed, the respective clamping parts are pivoted from a horizontal position to a substantially vertical position so that at least one gel cell is firmly attached to the main body on at least one surface of the main body.

The main body of electrophoresis device having glass gel cell fast assemble structure as disclosed by various embodiment of the invention is advantageous in that smooth and fast assembly of gel cell to the main body is realized, and that in-situ gel casting is realized so that gel movement is no long necessary and as a result introduction of air bubble into the cast gel which may in turn affect the following experiment is avoid.

Other aspects and features of embodiments of the present invention will become apparent to those of ordinary skill in the art, upon reviewing the following detailed description in conjunction with the accompanying figures.

BRIEF DESCRIPTION OF THE FIGURES

The various embodiments of the invention can be better understood with reference to the following drawings. The components in the drawings are not necessarily to scale, emphasis instead being placed upon clearly illustrating the principles of the various embodiments of the present invention. In the drawings, like reference numerals designate corresponding parts throughout the several views.

DETAILED DESCRIPTION OF PREFERRED EMBODIMENTS

Figure 1:
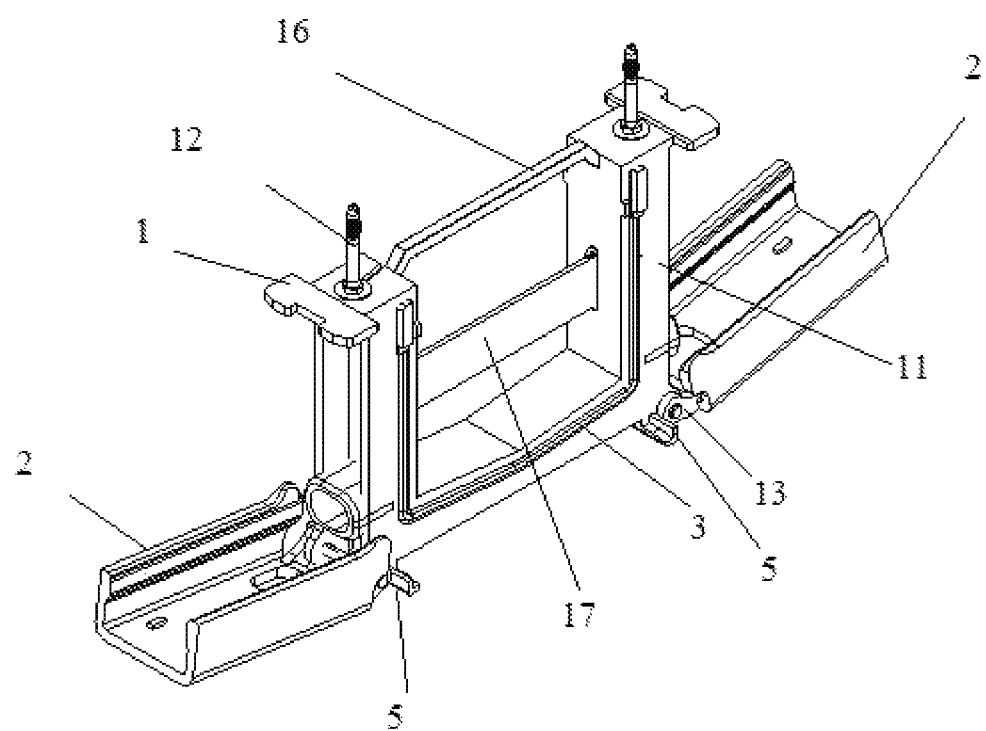
FIG. 1 is a schematic view of a stand along main body of electrophoresis device having glass gel cell fast assemble structure according to one embodiment of the invention.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "comprising" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

In an exemplary embodiment of the present invention, as shown in FIG. 1, the main body of electrophoresis device having glass gel cell fast assemble structure according to one embodiment of the invention comprises a main body 1 that has a substantially U-shaped body frame 11, wherein on the top of the U-shaped body frame 11 is disposed a pair of electrode connection terminals 12, and wherein a pairs of clamping parts 2 are connected pivotally (one each) to respective sides of the body frame 11.

Figure 6:
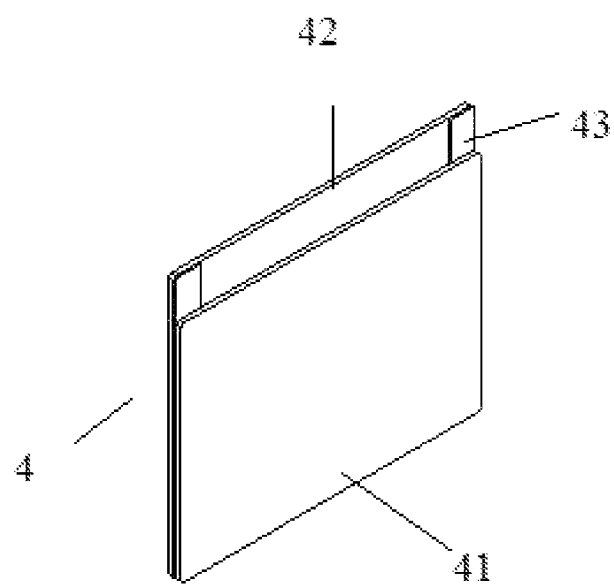
FIG. 6 is a schematic view of the gel cell.
Figure 7:
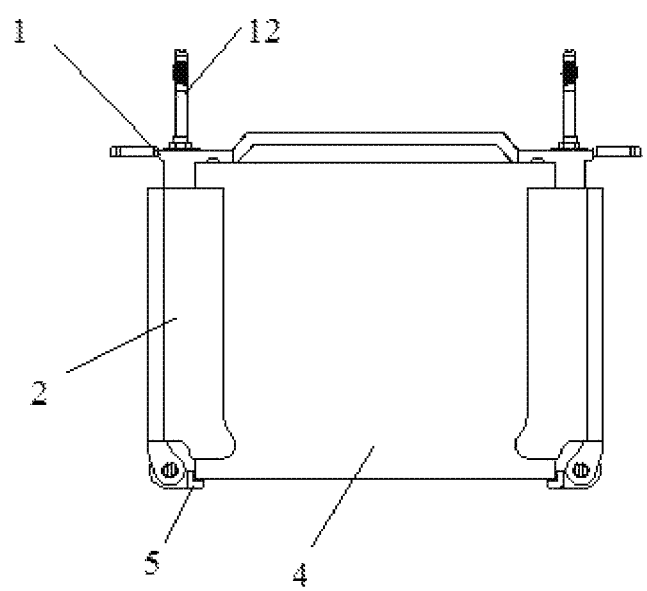
FIG. 7 is a schematic view of the electrophoresis device with the clamping parts folded.

One gel cell 4 that can be assembled to the main body comprises a short plate 41 and a long plate 42, the short plate and the long plate overlapping one another, and particularly in the area of the whole short plate. The overlapped area is further sealed from both sides by a pair of sealing strips 43, as shown in FIG. 6.

Figure 2:
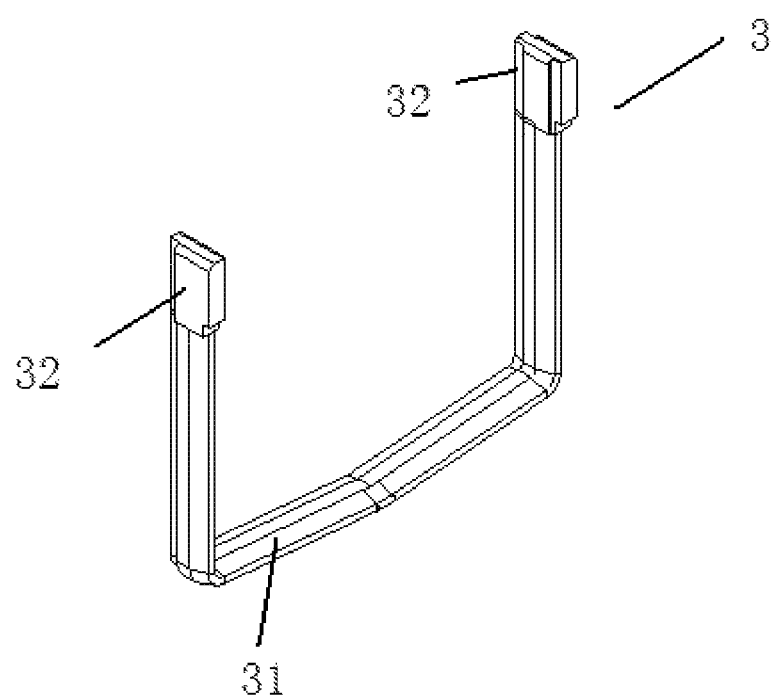
FIG. 2 is a schematic view of the U-shaped sealing strip to be mounted to the main body of electrophoresis device having glass gel cell fast assemble structure.

As the main body can be used to hold more than one gel cell, at least the front surface, and preferably both the front surface and the rear surface, of the main body is/are partially inlayed with a U-shaped sealing stripe 3. As shown in FIG. 2, a typical U-shaped sealing strip can comprise a sealing body 31 for sealing the short plate, and two protrusions 32 for sealing the long plate, and in the meantime for positioning the whole gel cell from the top. The U-shaped sealing strip can be particularly made of elastic material, such as rubble synthetic rubber, or silicon so that at least the protrusions 32 are elastically deformable.

The U-shaped body frame can further comprise at least on one surface of the body frame a positioning pole pair 5 extended vertically from the body frame for maintaining the gel cell in position. The positioning pole pair is arranged opposite to the protrusions 32 such that the short plate 41 can be positioned between the positioning pole pair and the protrusions 32 of the U shaped sealing strip and the bottom edge of the long plate can be sat against the positioning pole pair.

A handle 16 can be provided between the columns of the U-shaped body frame, and a strengthening plate can also be provided between the columns of the U-shaped body frame and below the handle 16.

Figure 3:
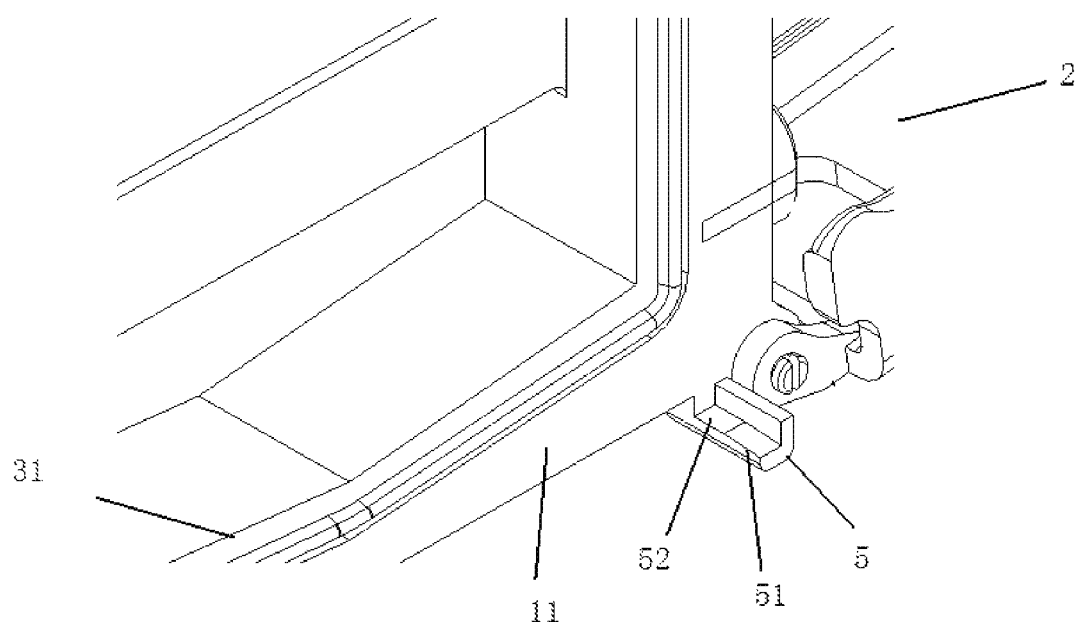
FIG. 3 is an enlarged view showing a positioning pole especially the guiding portion thereof.
Figure 4:
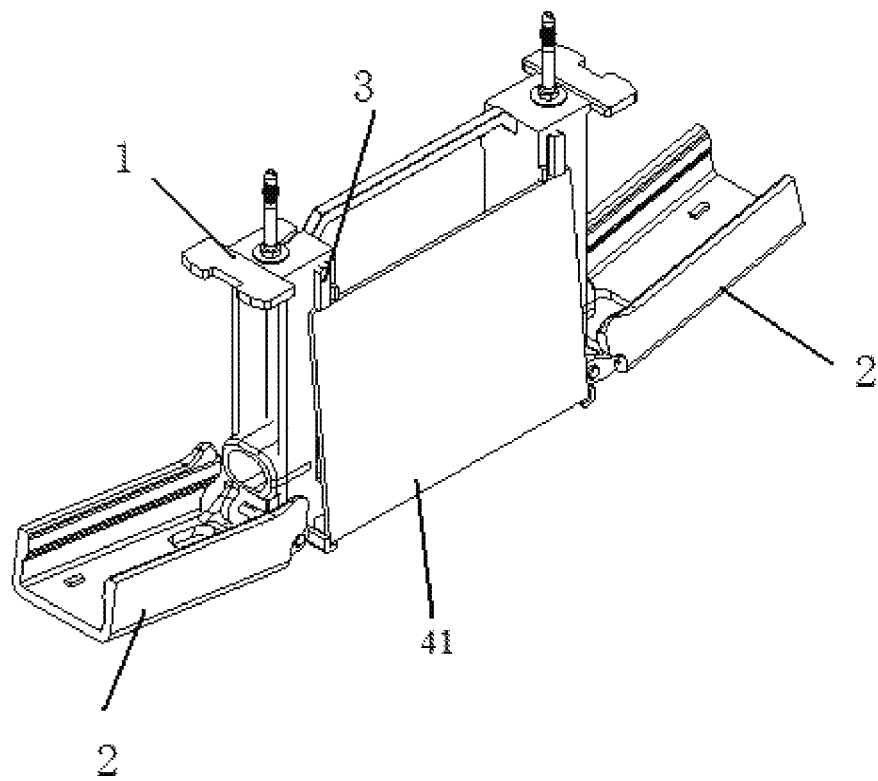
FIG. 4 is a schematic view of the scenario where the short plate of the gel cell is to be attached to the main body.

As shown in FIG. 3, the positioning pole can be made of L-shaped steel bar and can be provided at one end distal to the body frame with a guiding portion 51 for guiding in the gel cell, and particularly the short plate of the gel cell, and at the other end adjacent to the body frame a positioning portion 52 for maintaining the gel cell and particularly the short plate of the gel cell.

The guiding portion can be in the form of a wedge or an arc, and the positioning portion can be disposed perpendicular to the body frame.

Figure 5:
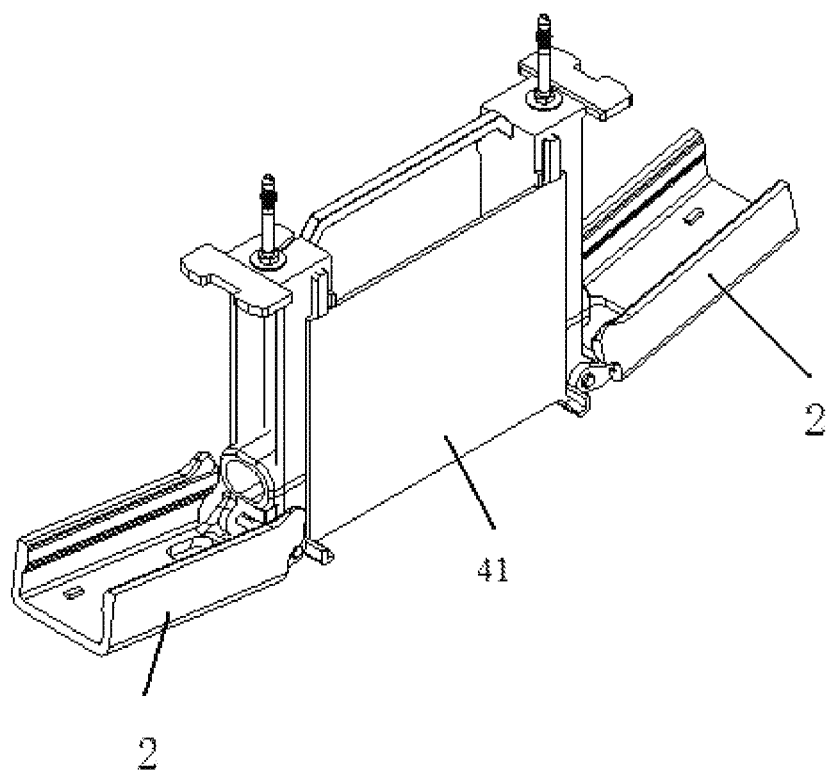
FIG. 5 is a schematic view of the scenario where the short plate of the gel cell has been attached to the main body.

When the gel cell is to be mounted to the electrophoresis device, the top edge of the short plate is brought to be pressed against the lower surface positioning protrusions 32 of the U-shaped sealing strip 3, and the bottom edge of the short plate is then pushed along the guiding portion to the positioning portion 52 so that the short plate 41 is positioned between the positioning portions 52 and the positioning protrusions 32. The long plate having side sealing strips attached thereon is then placed on the positioning portions 52 with side sealing strips in firm contact with the short plate, as shown in FIG. 5. After the long plate is assembled, the clamping parts are then pivoted from a horizontal position to a substantially vertical position so that the gel cell is firmly fixed to the body frame.

One improvement of the fast assemble structure is that one positioning pole comprising both the positioning portion and the guiding portion is beneficially provided so that the short plate can be fired attached to the body frame and maintained by the positioning portions and the positioning protrusions as well as perfectly sealed by the body of the U-shaped sealing strip. And in the meantime, by providing the guiding portion, the short plate can be directed towards the body frame more easily via the positioning portion in addition to the support from to the gel cell from below.

What is claimed is:

1. An electrophoresis device having glass gel cell fast assemble structure comprising:
    a main body;
    a pair of electrode connection terminals attached to the main body; and
    side clamping parts pivotally connected to the main body on respective side of the main body for maintaining at least one glass gel cell to a surface of the main body, the gel cell comprising a short plate with a bottom edge and a top edge, a long plate partially overlapping the short plate, and side sealing strips disposed between side portions of the short plate and the long plate;
    wherein at least one sealing and positioning structure is provided on a surface of the main body that comprise a U-shaped sealing strip partially inlayed on at least one surface of the main body, and at least a pair of L-shaped positioning poles perpendicularly attached to the main body, wherein the U-shaped sealing strip has a U-shaped body to form a seal between the main body and the gel cell, and positioning protrusions formed on the respective free end of the U-shaped body;
    wherein each of the L-shaped positioning poles is provided at its distal end with a wedge or arc shaped guiding portion located perpendicular to and abutting the main body and configured to guide in the bottom edge of the short plate to the main body after the top edge of the short plate is brought to be pressed against a lower surface of the positioning protrusions of the U-shaped body of the U-shaped sealing strip, so that the short plate of the gel cell is maintained by the guiding portions of the positioning poles and the positioning protrusions of the U-shaped body of the U-shaped sealing strip.

2. The electrophoresis device of claim 1, wherein the side of the overlapping area of the short and long plates is sealed.

* * * * *